United States Patent [19]

Vadjushin

[11] 3,707,780
[45] Jan. 2, 1973

[54] TEACHING MACHINE

[76] Inventor: Vladimir Alexandrovich Vadjushin, ulitsa Knorina, 19, kv. 28, Minsk, U.S.S.R.

[22] Filed: June 28, 1971

[21] Appl. No.: 157,450

[52] U.S. Cl. ................................................. 35/9 F
[51] Int. Cl. ............................................. G09b 3/00
[58] Field of Search .......................... 35/9 R, 9 E, 9 F

[56] References Cited

FOREIGN PATENTS OR APPLICATIONS 211,172   8/1968   U.S.S.R. ................................. 35/9 F

Primary Examiner—Wm. H. Grieb
Attorney—Holman & Stern

[57] ABSTRACT

A teaching machine has a body which is divided into two sections by means of a partition wall, one of the sections of the body accommodates a draw-out cassette containing a control program which consists of columns of questions and correct answers to them. The other section accommodates sheets with answers to be evaluated, and the body wall adjoining the latter section features a transparent window. Mounted in the body is a locking mechanism adapted to prevent the drawing-out of the cassette up to the column of correct answers when the section accommodating the answers to be evaluated is opened and to provide for the opening of the latter section after covering the correct answers.

2 Claims, 7 Drawing Figures

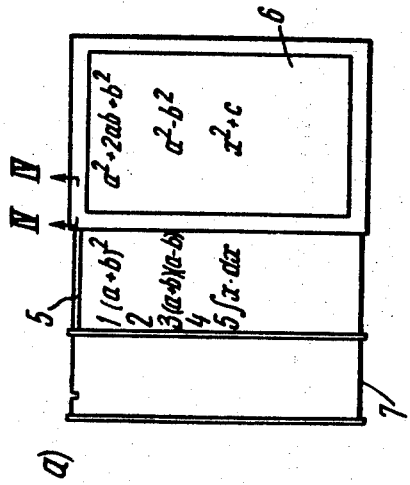
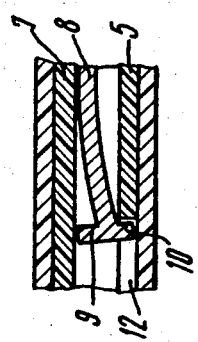
FIG.2
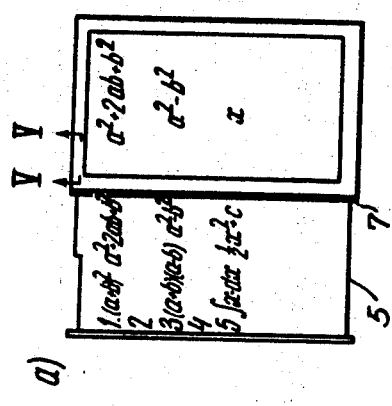
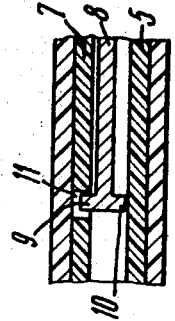
FIG.3
FIG.4
FIG.5

TEACHING MACHINE

FIELD OF THE INVENTION

The present invention relates to improvements in teaching machines designed to check and evaluate written or graphic answers.

DESCRIPTION OF PRIOR ART

Known in the art is a knowledge-checking device comprising a body adapted to be loaded with a control program (questions and correct answers to them) and a sheet of paper to be filled with answers to be evaluated (checked), that is, the answers to be written down by the examinee. This known device has a non-transparent flap cover connected to the body and serving to cover the correct answers of the program in the process of constructing answers to be evaluated. In such a device provision is also made for a movable transparent plate adapted to preclude the possibility of access to the answers to be evaluated in case the non-transparent cover is opened, that is, when the examinee can see the correct answers.

However, in such known devices it is possible to undo the lock for opening the transparent plate, whereby an access can be gained to the answers to be evaluated while the non-transparent cover is opened.

This provides a possibility of mechanically copying correct answers and correcting errors without proper learning under conditions of self-scoring.

There are also known teaching machines which comprise programs entered on paper tapes placed on drums, and paper tapes for answers, likewise placed on drums that are moved by means of rotatable handles or levers. Such devices provide for the delivery of questions alternately with the delivery of correct answers of the program following the recording of each answer to be evaluated. In such machines the tape with the program moves smoothly, and there exists a possibility of at least partial exposure of a correct answer before the access to the respective answer to be evaluated is fully closed. This possibility is disadvantageous in that it allows the examinee to make various inadmissible corrections in answers to evaluated. Moreover, such a consecutive evaluation of errors after each question affects the attention of the examinee diverting him from working on the subsequent question.

DESCRIPTION OF THE INVENTION

It is an object of the present invention to develop a teaching machine designed so as to preclude the possibility of making inadmissible corrections of answers to be evaluated, as well as to provide for better conditions of checking the knowledge and self-scoring along with improving the reliability of the machine operation.

Said and other objects of the present invention are accomplished owing to the fact that the body of the teaching machine according to the present invention is divided into sections, one of which accommodates a draw-out cassette carrying a sheet containing the control program, while the other section is adapted to accommodate a sheet with answers to be evaluated and features a transparent window, said body housing a locking mechanism fashioned so that the drawing-out of the cassette up to the column of correct answers is only possible after locking the section adapted to accommodate the sheet with answers to be evaluated, while the opening of the latter section is only possible after covering the correct answers.

Such an arrangement of the machine helps fully eliminate the possibility of the examinee seeing the correct reference answers before the access to the answers to be evaluated has been closed, thereby providing for unbiased and reliable checking. At the same time, the design according to the present invention ensures self-checking characterized by an improved quality of learning thanks to the elimination of the possibility of a mechanical (without real comprehension) correction.

In one of the structural embodiments of the teaching machine of the present invention, a section adapted to accommodate sheets with answers to be evaluated houses a sliding transparent plate adapted to overlap a window and close the access to the answers to be evaluated in the drawn-in position of the plate, while there is provided a locking mechanism which is essentially a cantilever-mounted springy plate arranged longitudinally with respect to the cassette movement and provided on its free end with projections facing the cassette and the transparent plate, both of which are provided with grooves; one of said projections, on engaging in the plate groove, provides for locking the plate and for a possibility of complete withdrawal of the cassette, whereas, upon the removal and disengagement of said projection from the plate groove, the other projection moves into the cassette groove to preclude the drawing-out of the cassette with correct answers.

Such a design result in a device which is simple to manufacture and reliable in operation.

BRIEF DESCRIPTION OF THE DRAWINGS

Presented hereinbelow is an exemplary detailed description of the preferred embodiment of the invention, due reference being had to the accompanying drawings, in which:

FIG. 2a illustrates the position of elements of the teaching machine of the invention in the process of the examinee answering the questions of the control program;

FIG. 2b shows a plan view of the machine of FIG. 2a;

FIG. 3a illustrates the position of elements of the teaching machine of the invention while comparing the examinee's answers to be evaluated with the correct answers of the control program;

FIG. 3b shows a plan view of the illustration in FIG. 3a;

FIG. 4 is a section taken on the line IV—IV of FIG. 2, illustrating the locking mechanism in a position corresponding to the process of constructing an answer; and FIG. 5 is a section on the line V—V of FIG. 3, illustrating the locking mechanism in a position corresponding to the process of checking the answers to be evaluated.

Referring now to FIG. 1 of the drawings, a body 1 of the teaching machine according to the invention is divided into two sections, 2 and 3, by means of a non-transparent partition 4. The section 2 houses a cassette 5 adapted to be drawn-out (as shown by arrows) from the body 1 and designed to accommodate a control program. The control program consists of columns of questions in the left-hand portion of a sheet of paper, and columns of correct answers to said questions in the right-hand portion of the same sheet of paper. The section 3 is adapted to accommodate a sheet with answers to be evaluated. For writing down the answers, the body 1 is provided with a window 6.

Figure 1:
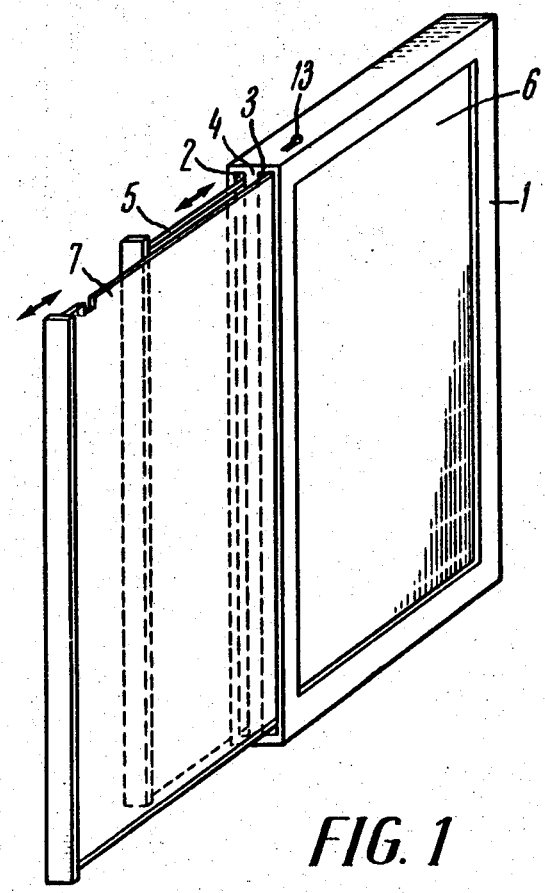
FIG. 1 shows a diagrammatic arrangement of teaching machine according to the present invention.

Mounted in the section 3 is a movable transparent plate 7 adapted on sliding to overlap the window 6 so that the sheet with the answers to be evaluated remains under said transparent plate.

Owing to the transparency of the plate 7, the examinee is capable of seeing the questions of the control program (FIG. 2a) in the drawn-out position of the plate 7 (cf., FIGS. 2a and 2b) and, at the same time, of writing down answers through the window 6. In the drawn-in position (FIGS. 3a and 3b) of the plate 7, the window 6 is over-lapped and the examinee has no access to the sheet with the answers to be evaluated. At the same time, the whole of the control program is visible.

Mounted in the upper portion of the body 1 inside the latter is a cantilevered springy plate 8 (cf., FIGS. 4 and 5) provided on its free end with projections 9 and 10 facing the transparent plate 7 and the cassette 5, respectively. The plate 7 has a groove 11, and the cassette 5 has an elongated groove 12. For withdrawing the projection 9 from the groove 11, provision is made of a special key (not shown in the drawings) to be inserted in a key slot 13 (FIG. 1).

The teaching machine according to the present invention functions in the following manner.

By turning the key the plate 8 is deflected until the projection 9 is withdrawn from the groove 11, and the transparent plate 7 is drawn out of the opening 3 to open the window 6. Through the window 6 a clean sheet of paper for the answers to be written on and to be evaluated is placed on the partition 4. At this moment, the projection 10 sinks and engages in the elongated groove 12 (FIG. 4). The cassette 5 is drawn out of the body 1 until the projection 1 is thrust against the wall of the groove. As a result, only the questions of the control program can be seen, as shown in FIG. 2a.

The examinee writes down on the clean sheet of paper the answers to said questions. Following the completion of the answers, the plate 7 is drawn inside the transparent section 3 of the body 1 until the projection 9 (FIG. 5) engages in the groove 11. When so doing, the projection 10 leaves the elongated groove 12 of the cassette 5 and the latter is fully drawn out until the appearance of the column with correct answers, as shown in FIG. 3a.

Since it is impossible to draw out the plate 7 with the projection 9 sunk in the groove 11, the access to the answers to be evaluated is closed, thereby ensuring the objectivity and reliability in checking the knowledge of the examinee.

In order to analyze the errors made, it is necessary to once more gain an access to the answers to be evaluated, which is only possible after moving the portion of the cassette 5 containing the correct answers inside the body 1 and a subsequent deflection of the plate 8 by the key until the projection 9 leaves the groove 11. Otherwise, the projection 10 will prevent the projection 9 from leaving the groove 11.

Therefore, the teaching machine described hereinabove helps improve the quality of the error analysis by preventing the any possibility of an examinee from mechanically copying concealed correct answers.

We claim:

1. A teaching machine, comprising: a body-housing having a first compartment designed to accommodate a control program that essentially includes a sheet containing a column of questions and a succeeding column of correct answers to said questions and a second adjacent compartment designed to accommodate a sheet of paper to receive answers to be evaluated given by the examinee to the questions of the control program, said second compartment including a transparent window made in said body disposed so as to cover said sheet of paper; a cassette adapted to carry said sheet of the control program and mounted in said first compartment, the first compartment including means enabling said cassette being drawn out from said body; a transparent plate which can be slid into said window to cover said sheet of paper and means to lock the second compartment with transparent plate in its inserted position; a mechanism adapted for selectively locking said cassette in the housing so that a complete drawing-out of said cassette from said housing is possible only after said second compartment is locked, unlocking of said means to lock the second compartment being possibly only after covering the column of correct answers by partly drawing said cassette inside the body.

2. A teaching machine of claim 1, wherein the locking mechanism comprises a cantilever-mounted springy plate arranged longitudinally with respect to the direction of the movement of said cassette and provided on its free end with projections facing the cassette and said transparent plate, both the casette and the transparent plate being provided with grooves which are substantially complementary to said projections, the engagement of one of said projections in the groove of the transparent plate providing for locking the transparent plate and for the possibility of complete withdrawal of the cassette, whereas, upon disengagement of said one of the projections from the groove of the transparent plate, the other one of said projections moves into the cassette groove to prevent the drawing-out of the cassette containing the correct answers.

* * * * *